(12) United States Patent
De Bast

(10) Patent No.: US 8,160,651 B2
(45) Date of Patent: *Apr. 17, 2012

(54) MOBILE TELEPHONE WITH IMPROVED MAN MACHINE INTERFACE

(75) Inventor: Christopher De Bast, Buckinghamshire (GB)

(73) Assignee: Motorola Mobility, Inc., Libertyville, IL (US)

(*) Notice: Subject to any disclaimer, the term of this patent is extended or adjusted under 35 U.S.C. 154(b) by 590 days.

This patent is subject to a terminal disclaimer.

(21) Appl. No.: 12/109,034

(22) Filed: Apr. 24, 2008
(Under 37 CFR 1.47)

(65) Prior Publication Data

US 2008/0200213 A1 Aug. 21, 2008

Related U.S. Application Data

(60) Division of application No. 11/646,356, filed on Dec. 28, 2006, now Pat. No. 7,624,357, which is a continuation of application No. 10/203,714, filed on Mar. 3, 2003, now Pat. No. 7,283,845.

(30) Foreign Application Priority Data

Feb. 18, 2000 (GB) .................................. 0003943.8

(51) Int. Cl.
*H04B 1/38* (2006.01)
(52) U.S. Cl. ..................... 455/566; 455/550.1; 715/856; 715/810
(58) Field of Classification Search .................. 455/566, 455/556.2, 466, 550.1; 715/810, 819, 817, 715/835, 836, 837, 839, 840, 859, 890, 856, 715/975, 828, 829, 841
See application file for complete search history.

(56) References Cited

U.S. PATENT DOCUMENTS

| | | |
|---|---|---|
| 4,291,198 A | 9/1981 | Anderson et al. |
| 4,425,627 A | 1/1984 | Eibner |
| 4,653,086 A | 3/1987 | Laube |
| 4,786,902 A | 11/1988 | Davis et al. |
| 5,075,290 A | 12/1991 | Findley et al. |
| 5,157,391 A | 10/1992 | Weitzen |
| 5,166,666 A | 11/1992 | Tanaka |
| 5,214,522 A | 5/1993 | Tagawa |

(Continued)

FOREIGN PATENT DOCUMENTS

DE 295 16 018 U1 12/1996

(Continued)

OTHER PUBLICATIONS

European Examination Repoort Under Section 17(6) based on United Kingdom Patent Application GB 0003941.2; Date of Report: Jan. 23, 2003.

(Continued)

*Primary Examiner* — Jean Gelin

(57) ABSTRACT

The present invention envisages a GSM mobile telephone in which a line of icons is displayed on a display. As a user navigates through the displayed line of icons, the positions of the icons alter so that the selectable icon moves to the head of the line. This approach makes it very clear (i) which icon is selectable at any time and (ii) where that icon sits in relation to other icons at the same functional level (e.g. only first level icons will be present in one line). First level icons typically relate to the following functions: phonebook; messages; call register; counters; call diversion; telephone settings; network details; voice mail and IrDA activation.

20 Claims, 5 Drawing Sheets

U.S. PATENT DOCUMENTS

| | | | |
|---|---|---|---|
| 5,260,993 | A | 11/1993 | Breeden et al. |
| 5,303,388 | A | 4/1994 | Kreitman et al. |
| 5,307,456 | A | 4/1994 | MacKay |
| 5,333,073 | A | 7/1994 | Suzuki |
| 5,434,965 | A | 7/1995 | Matheny et al. |
| 5,453,761 | A | 9/1995 | Tanaka |
| 5,537,474 | A | 7/1996 | Brown et al. |
| 5,546,447 | A | 8/1996 | Skarbo et al. |
| 5,548,084 | A | 8/1996 | Tracy |
| 5,550,969 | A | 8/1996 | Torres et al. |
| 5,565,888 | A | 10/1996 | Selker |
| 5,579,535 | A | 11/1996 | Orlen et al. |
| 5,586,237 | A | 12/1996 | Baecker et al. |
| 5,611,031 | A | 3/1997 | Hertzfeld et al. |
| 5,630,159 | A | 5/1997 | Zancho |
| 5,633,484 | A | 5/1997 | Zancho et al. |
| 5,668,875 | A | 9/1997 | Brown et al. |
| 5,689,669 | A | 11/1997 | Lynch et al. |
| 5,692,145 | A | 11/1997 | Nakanishi |
| 5,716,805 | A | 2/1998 | Srinivasan et al. |
| 5,736,974 | A * | 4/1998 | Selker ................ 715/862 |
| 5,745,109 | A | 4/1998 | Nakano et al. |
| 5,767,835 | A | 6/1998 | Obbink et al. |
| 5,771,469 | A | 6/1998 | Toba |
| 5,774,199 | A | 6/1998 | Ozawa |
| 5,774,540 | A | 6/1998 | Davidson et al. |
| 5,814,798 | A | 9/1998 | Zancho |
| 5,841,849 | A | 11/1998 | Macor |
| 5,848,356 | A | 12/1998 | Jambhekar et al. |
| 5,870,683 | A | 2/1999 | Wells et al. |
| 5,880,722 | A | 3/1999 | Johnston, Jr. et al. |
| 5,889,509 | A | 3/1999 | Sudo |
| 5,889,852 | A | 3/1999 | Rosecrans et al. |
| 5,909,183 | A | 6/1999 | Borgstahl et al. |
| 5,920,826 | A | 7/1999 | Metso et al. |
| 5,923,327 | A | 7/1999 | Smith et al. |
| 5,926,178 | A | 7/1999 | Kurtenbach |
| 5,940,076 | A | 8/1999 | Sommers et al. |
| 5,969,837 | A | 10/1999 | Farber et al. |
| 5,973,694 | A | 10/1999 | Steele et al. |
| 6,005,567 | A | 12/1999 | Nielsen |
| 6,006,118 | A | 12/1999 | Stephenson |
| 6,018,671 | A | 1/2000 | Bremer |
| 6,030,992 | A | 2/2000 | Gitter et al. |
| 6,047,197 | A | 4/2000 | Jarrad |
| 6,049,336 | A | 4/2000 | Liu et al. |
| 6,069,614 | A | 5/2000 | Singhal |
| 6,073,005 | A | 6/2000 | Raith et al. |
| 6,073,036 | A | 6/2000 | Heikkinen et al. |
| 6,081,266 | A | 6/2000 | Sciammarella |
| 6,088,594 | A | 7/2000 | Kingdon et al. |
| 6,097,390 | A | 8/2000 | Marks |
| 6,100,876 | A | 8/2000 | Tanaka |
| 6,100,888 | A * | 8/2000 | Gourdol et al. ........... 715/837 |
| 6,108,534 | A | 8/2000 | Bourgeois et al. |
| 6,119,014 | A | 9/2000 | Alperovich et al. |
| 6,148,241 | A | 11/2000 | Ludtke et al. |
| 6,157,814 | A * | 12/2000 | Hymel et al. ............. 340/7.56 |
| 6,169,911 | B1 | 1/2001 | Wagner et al. |
| 6,188,406 | B1 | 2/2001 | Fong et al. |
| 6,192,124 | B1 | 2/2001 | Yim |
| 6,201,540 | B1 | 3/2001 | Gallup et al. |
| 6,201,554 | B1 | 3/2001 | Lands |
| 6,211,856 | B1 | 4/2001 | Choi et al. |
| 236,398 | A1 | 5/2001 | Kojima et al. |
| 6,226,500 | B1 | 5/2001 | Nonami |
| 6,232,973 | B1 | 5/2001 | Dow et al. |
| 6,271,842 | B1 | 8/2001 | Bardon et al. |
| 6,278,454 | B1 | 8/2001 | Krishnan |
| 6,282,183 | B1 | 8/2001 | Harris et al. |
| 6,285,367 | B1 | 9/2001 | Abrams et al. |
| 6,292,188 | B1 | 9/2001 | Carlson et al. |
| 6,301,487 | B1 | 10/2001 | Nakamura |
| 6,310,633 | B1 | 10/2001 | Graham |
| 6,331,972 | B1 | 12/2001 | Harris et al. |
| 6,333,333 | B1 | 12/2001 | Bishop et al. |
| 6,335,730 | B1 | 1/2002 | Gould |
| 6,359,615 | B1 | 3/2002 | Singh |
| 6,366,302 | B1 | 4/2002 | Crosby et al. |
| 6,377,285 | B1 | 4/2002 | Doan et al. |
| 6,392,660 | B2 | 5/2002 | Karjalainen |
| 6,396,516 | B1 | 5/2002 | Beatty |
| 6,405,030 | B1 | 6/2002 | Suprunov |
| 6,415,164 | B1 | 7/2002 | Blanchard et al. |
| 6,453,179 | B1 | 9/2002 | Larsen |
| 6,456,841 | B1 | 9/2002 | Tomimori |
| 6,456,892 | B1 | 9/2002 | Dara-Abrams et al. |
| 6,469,617 | B1 | 10/2002 | Goodwin, III et al. |
| 6,480,245 | B1 | 11/2002 | Sakamoto et al. |
| 6,489,977 | B2 | 12/2002 | Sone |
| 6,490,444 | B1 | 12/2002 | Bossemeyer, Jr. et al. |
| 6,505,055 | B1 | 1/2003 | Kahn et al. |
| 6,510,515 | B1 | 1/2003 | Raith |
| 6,522,347 | B1 * | 2/2003 | Tsuji et al. .................... 715/848 |
| 6,527,641 | B1 | 3/2003 | Sinclair et al. |
| 6,538,672 | B1 | 3/2003 | Dobbelaar |
| 6,554,707 | B1 | 4/2003 | Sinclair et al. |
| 6,556,666 | B1 | 4/2003 | Beyda et al. |
| 6,600,936 | B1 | 7/2003 | Karkkainen et al. |
| 6,621,508 | B1 * | 9/2003 | Shiraishi et al. ............. 715/810 |
| 6,628,771 | B1 | 9/2003 | Frise et al. |
| 6,636,236 | B1 | 10/2003 | Toda |
| 6,646,626 | B1 | 11/2003 | Uskali et al. |
| 6,658,268 | B1 | 12/2003 | Bodnar et al. |
| 6,760,311 | B1 | 7/2004 | Raith |
| 6,768,909 | B1 | 7/2004 | Irvin |
| 6,809,724 | B1 * | 10/2004 | Shiraishi et al. ............. 345/169 |
| 6,868,155 | B1 | 3/2005 | Cannon et al. |
| 6,888,927 | B1 | 5/2005 | Cruickshank et al. |
| 6,950,679 | B2 | 9/2005 | Sugiyama et al. |
| 6,957,091 | B1 | 10/2005 | Ptasinski et al. |
| 6,983,426 | B1 | 1/2006 | Kobayashi et al. |
| 7,017,122 | B1 | 3/2006 | Lee et al. |
| 7,283,845 | B2 | 10/2007 | De Bast |
| 7,293,241 | B1 | 11/2007 | Tornqvist et al. |
| 7,624,357 | B2 | 11/2009 | De Bast |
| 6,281,895 | B1 | 8/2011 | Jeong |
| 2001/0029194 | A1 | 10/2001 | Ketola et al. |
| 2002/0041292 | A1 | 4/2002 | Son et al. |

FOREIGN PATENT DOCUMENTS

| | | |
|---|---|---|
| EP | 0 227 327 A2 | 7/1987 |
| EP | 0 398 648 A2 | 11/1990 |
| EP | 0 398 711 A2 | 11/1990 |
| EP | 0 651 543 A2 | 10/1994 |
| EP | 0 631 416 A2 | 12/1994 |
| EP | 0 685 953 A1 | 12/1995 |
| EP | 0 727 730 A2 | 8/1996 |
| EP | 0 727 732 A1 | 8/1996 |
| EP | 0 768 784 A2 | 4/1997 |
| EP | 0 831 629 A2 | 3/1998 |
| EP | 0 880 090 A2 | 11/1998 |
| EP | 0 917 330 A2 | 5/1999 |
| EP | 0 851 647 | 11/1999 |
| EP | 0 962 852 A2 | 12/1999 |
| EP | 0 982 911 A2 | 3/2000 |
| EP | 1 028 579 A2 | 8/2000 |
| EP | 1 130 886 A2 | 9/2001 |
| EP | 0 982 911 A3 | 5/2003 |
| GB | 2 276 520 A | 9/1994 |
| GB | 2 306 078 A | 11/1996 |
| GB | 2 329 813 A | 3/1999 |
| GB | 2 331 823 A | 6/1999 |
| GB | 2 333 215 A | 7/1999 |
| GB | 2 344 260 A | 5/2000 |
| GB | 2 350 994 | 12/2000 |
| GB | 2 355 144 A | 4/2001 |
| GB | 2 359 459 A | 8/2001 |
| GB | 2 359 697 A | 8/2001 |
| GB | 2 360 920 A | 10/2001 |
| GB | 2 362 550 A | 11/2001 |
| GB | 2 364 158 | 1/2002 |
| GB | 2 365 675 | 2/2002 |
| GB | 2 365 676 A | 2/2002 |
| GB | 2 369 189 | 5/2002 |

| | | | |
|---|---|---|---|
| GB | 2 329 813 B | | 7/2002 |
| GB | 2 364 158 B | | 1/2004 |
| GB | 2 365 675 B | | 6/2004 |
| JP | 08 307495 | | 11/1996 |
| JP | 10 023117 | | 1/1998 |
| JP | 10-269-022 | | 10/1998 |
| JP | 11 136323 | | 5/1999 |
| JP | 2001007895 | | 6/1999 |
| JP | 2000115304 | | 4/2000 |
| WO | WO-89 10610 | | 11/1989 |
| WO | WO-91 06050 | | 5/1991 |
| WO | WO-97 46974 | | 12/1997 |
| WO | WO-98 24216 | | 6/1998 |
| WO | WO-98 30004 | | 7/1998 |
| WO | WO-98 48551 | | 10/1998 |
| WO | WO-98 48555 | | 10/1998 |
| WO | WO-99 13627 | | 3/1999 |
| WO | WO-99 16181 | | 4/1999 |
| WO | WO-99 18495 | | 4/1999 |
| WO | WO-99 32960 | | 7/1999 |
| WO | WO-99 37075 | | 7/1999 |
| WO | WO 99/37075 | | 7/1999 |
| WO | WO-00 58778 | | 10/2000 |
| WO | WO-00 72300 | A1 | 11/2000 |
| WO | WO-01 50726 | A1 | 7/2001 |
| WO | WO-01 61443 | A2 | 8/2001 |
| WO | WO-01 61444 | A2 | 8/2001 |
| WO | WO-01 62018 | A2 | 8/2001 |

OTHER PUBLICATIONS

European Further Search Report Under Section 17 based on United kingdom Patent Application No. GB0003944.6; Date of Report: Dec. 11, 2003; (pp. 1-3).

European Search Report Under Section 17 based on United Kingdom Patent Application No. GB 9810668.5; Date of Search: Oct. 27, 1998.

European Search Report Under Section 17(5) based on United Kingdom Patent Application No. GB 0003941.2; Date of Report: Nov. 28, 2001.

European Search Report Under Section 18(3) based on United Kingdom Patent Application No. GB0003944.6; Applicant: Sensei Limited; Date of Report: Aug. 1, 2003; (pp. 1-3).

European Search ReportUncer Section 17(6) based on United Kingdom Patent Application No. GB 000 3941.2; Date of Report: Jan. 23, 2003.

International Preliminary Examination Report and Wriotten Opinion based on International Application No. PCT/GB01/00675; International Filing Date: Feb. 16, 2001; Date of Completion of Report: Jun. 12, 2002.

Owner's Operating Manual—Audiovox Communications Corp.; CDM-4000 and CDM-4000XL Dule Mode Digital CDMA Telephone; Printed in Japan Oct. 1999; Copyright 1999 (pp. 1-26).

Screen-Based Telephony; Author: Bob McNinch; Dated: Apr. 1990; IEEE Communications Magazine.

* cited by examiner

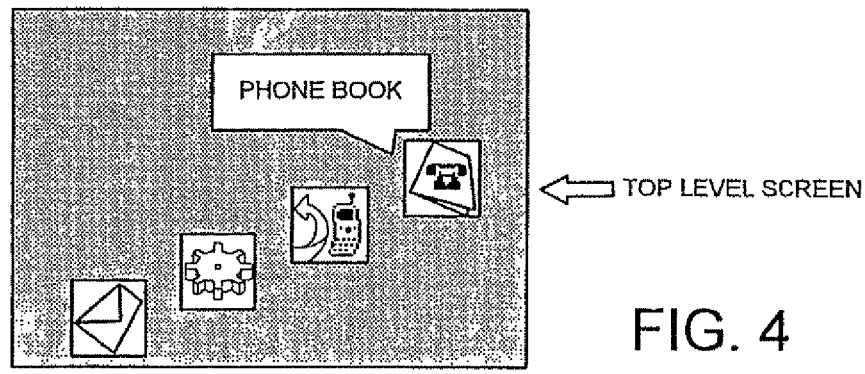
FIG. 4 — TOP LEVEL SCREEN
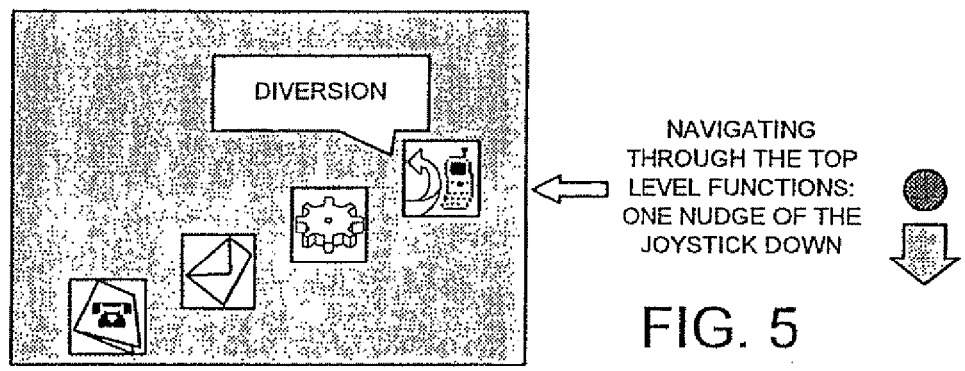
FIG. 5 — NAVIGATING THROUGH THE TOP LEVEL FUNCTIONS: ONE NUDGE OF THE JOYSTICK DOWN
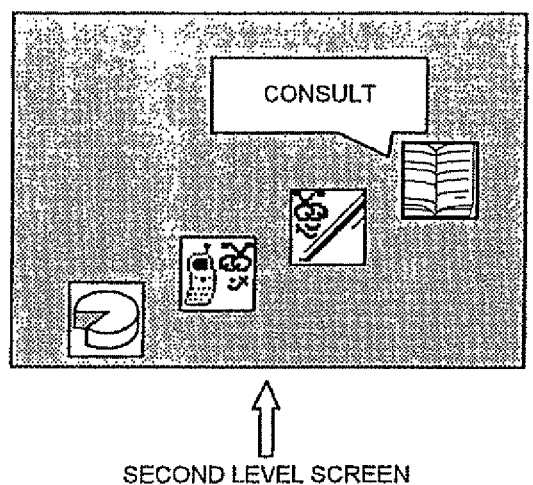
FIG. 6 — MOVING FROM THE TOP LEVEL PHONE BOOK FUNCTION TO ITS RELATED SECOND LEVEL FUNCTIONS: ONE NUDGE OF THE JOYSTICK TO THE RIGHT — SECOND LEVEL SCREEN NAVIGATING THROUGH THE SECOND LEVEL SCREEN: ONE NUDGE OF THE JOYSTICK DOWN
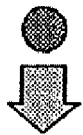
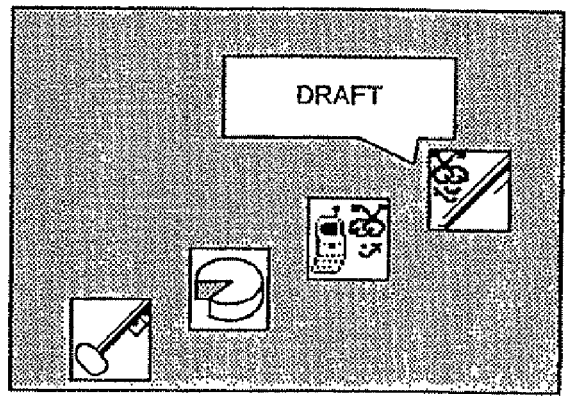
FIG. 7
NAVIGATING FURTHER THROUGH THE SECOND LEVEL SCREEN: ONE MORE NUDGE OF THE JOYSTICK DOWN
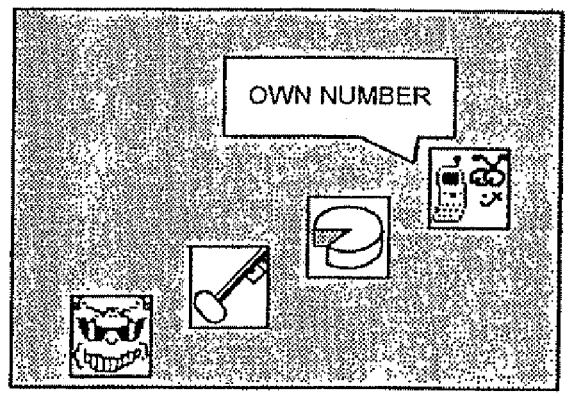
FIG. 8
FIG. 9
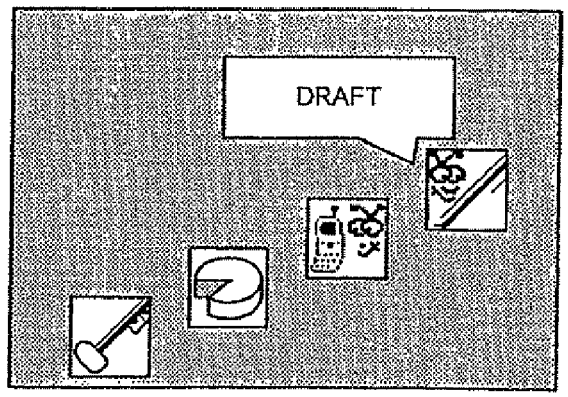
NAVIGATING THROUGH THE SECOND LEVEL SCREEN: ONE NUDGE OF THE JOYSTICK BACK UP AGAIN

MOBILE TELEPHONE WITH IMPROVED MAN MACHINE INTERFACE

This application is a divisional of U.S. patent application Ser. No. 11/646,356 filed Dec. 28, 2006 now U.S. Pat No. 7,624,357, which is a continuation of application Ser. No. 10/203,714 filed Mar. 3, 2003 now U.S. Pat No. 7,283,845, which claims the benefit of International application no. PCT/GB01/00665, filed Feb. 16, 2001.

FIELD OF THE INVENTION

This invention relates to a mobile telephone and in particular to a mobile telephone with an improved man machine interface, The term 'mobile telephone' used in this patent specification should be expansively construed to cover any kind of mobile device with communications capabilities and includes radio telephones, smart phones, communicators, and wireless information devices. It includes devices able to communicate using not only mobile radio such as GSM or UMTS, but also any other kind of wireless communications system, such as Bluetooth.

DESCRIPTION OF THE PRIOR ART

One of the problems facing the designers of mobile telephone user interfaces (often called 'man machine interfaces' or 'MMIs') is how to allow the user to comprehend the internal status of the mobile telephone. For example, to select or initiate a function (e.g. to open an address book function, enter a PIN security number or to alter the ring melody) a user has to understand that the status of the telephone is such that the function can be selected or initiated. A closely related problem is how to enable a user to confidently alter the internal status of the phone. This process can be thought of as the problem of how to enable a user to confidently navigate through the feature set of the telephone. Because many quite intricate operations have to be mastered early on for most mobile telephone users (setting security codes, altering ring melodies etc.), it is particularly important to facilitate the task of navigating to and activating features in the required way.

In addition, mobile telephones offer a very wide (and ever increasing) range of functions. The design of an effective MMI which can be (a) easily navigated by novices yet is (b) flexible enough to enable a large number of functions to be included, is a very challenging task. In fact, it is widely acknowledged that few mobile telephone owners regularly use any but the most basic telephone features because current MMIs are difficult to fully understand. Hence, the technical problem of effectively enabling the user to understand the internal status of the mobile telephone has to date been inadequately addressed.

One of the reasons why many conventional MMIs are inadequate is that mobile telephones are small handheld devices which generally include small display screens. The size of display screens, even for PDA type devices, is far too small to handle a rich and effective MMI, such as the Apple Macintosh Operating System MMI. As a consequence, MMI designers have tended to use text based MMIs, even though the superiority of graphical user interfaces has long been accepted in the desktop computing environment.

Conventionally, the small display size has also meant that several hierarchies of functions have to be offered to a user: the interface can be thought of as having many layers, with the user having to first locate the correct top level function and then, within that function, progressively drill down (sometimes through 3 or more layers) to complete the required task. Hence, for example, if a user wishes to enter a new telephone number into an address book stored on the mobile phone, he has to locate a top level function, typically called 'Address Book'. He then selects that function and is presented with a list of second level functions relevant to the 'Address book' top level function. These second level functions typically include options for reading the contents of the Address Book, entering a new number and password protecting access to the address book. Say the user selects the option for entering a new number; he then is presented with a third level screen display asking him to complete various fields with the contact information.

With pure text based, multi-level MMIs, it can be very difficult for users to build up an understanding of the structure of the MMI; without understanding, it is very difficult to navigate extensively.

Very recently, some manufacturers have introduced GSM mobile telephones which are beginning to move away from the text only MMI. For example, the Philips Xenium telephone can display several icons on screen: Nokia and Mitsubishi have GSM telephones which can display one icon on a screen at a time. Reference may also be made to some PC operating systems and applications, in which a contextual help system is used: when the user places the mouse arrow over an icon, folder etc. for more than a couple of seconds, a help call-out or balloon appears with an explanation of the function of the icon, folder etc.

It is particularly important that the physical device(s) used to control navigation are not only easy to operate but also that the way in which they are controlled intuitively matches up with the navigation tasks to be accomplished. Conventionally, these navigation devices are 4 separate buttons (for example, for Up, Down, Accept and Reject). A user has to carefully select the correct button. That generally means that the user has to take his eyes off the screen. In some devices, a single rocker switch will overlie 4 separate buttons. But rocker switches can also require a user to take his eyes off the screen and instead concentrate on selecting and using the navigation button correctly. That in turn makes it far harder, especially for the inexperienced user, to follow and concentrate on the MMI. Where the MMI is difficult to follow anyway (as with text based, multi-level conventional GSM telephones, for example), navigation devices which require a user to take his eyes off the screen can be difficult to use.

STATEMENT OF THE INVENTION

In accordance with a first aspect of the present invention, a mobile telephone comprises:

(i) computing means for storing representations of one or more icons; and a (ii) display operable to be controlled by the computing means to display one or more icons;

characterised in that the display is operable to show an array of several icons, the arrangement of the array altering as a user navigates through the array in a manner that visually indicates that the status of the computing means is such that the function associated with a single icon can be selected or initiated.

Typically, there will be an array which is a linear array of icons. A single icon is then distinguishable from the other icons by, for example, being at a prominent position within the array, such as at one end or the middle of the array. A circular array is also a possible option. The function associated with that single icon can be readily selected or initiated using a navigation tool such as a joystick. The icon itself can be thought of as being 'Selectable'. The selectable icon may also have displayed in proximity to it a word or words describing the function of the icon to (i) give it even greater prominence and (ii) to make its function explicitly clear.

The icons in the array may be animated so that their positions on the display alter as a user navigates through them. For example, the icons in the linear array can be animated to appear to move forward along the line of the array as different icons become selectable, i.e. as the user navigates along the line.

Preferably, selecting an icon in an array causes some or all of the other icons in the array to alter in appearance and/or position. The alteration may be an animation in which the other icons appear to twist or revolve and turn into different icons. This may act as an indication that one is changing levels (e.g. from a top level function to a second level function) and aids understanding of the MMI.

The present invention envisages a GSM mobile telephone embodiment in which a line of icons is displayed on a display: one of the icons is clearly selectable by for example being at the head of the line and being the only icon with explanatory text associated with it, typically in a balloon format. As a user navigates through the displayed line of icons, the identity of the selectable icon changes; this is reflected in the positions of the icons altering so that the selectable icon moves to the head of the line. This approach makes it very clear (i) which icon is selectable at any time and (ii) where that icon sits in relation to other icons at the same functional level (e.g. only first level icons will be present in one line). First level icons typically relate to the following functions: phonebook; messages; call register; counters; call diversion; telephone settings; network details; tools; voice mail and IrDA activation.

A zoom (i.e. magnification) function is preferably also provided by which a user can cause the size of the icon and/or the word or words explaining the function of that icon displayed on the display to be altered. The zoom function may be controlled by a volume up and a volume down button.

In one embodiment, the data representing an icon is stored in memory; the same data can be used to display the icon at normal size (typically 16.times.16 pixels) and also at one or more different sizes, such as an extended size (64.times.64). This scalability removes the need to store multiple representations in memory and therefore saves memory; instead a software algorithm alters the displayed size of the icon.

In another aspect, there is provided a mobile telephone comprising:

computing means for storing representations of one or more icons: and a display operable to be controlled by the computing means to display one or more icons;

characterised in that the display is operable to show an array of several icons, the appearance and/or position of some or all of the icons in the array altering as a user selects an icon to visually indicate that the status of the computing means is changing.

The alteration may be an animation in which some or all of the icons appear to twist or revolve and turn into different icons.

In a final aspect, there is provided a mobile telephone in which the idle screen alternates with an alert screen, each screen appearing for a pre-determined time. This leads to the layout of the idle screen not being cluttered with any kind of alert messages: conventionally, an alert message will be included together with the idle screen (e.g. '1 missed call'; 'You have a SMS'), but that clutters the screen and can obscure important branding information. In the present embodiment, the idle screen is shown for 5 seconds, and then an alert screen for 5 seconds if there are any alerts. The screens alternate until the user reads or reviews the alert screen in some way. Accessing the alert screen can take the user directly to the menu(s) which allow the user to respond to the alert. Hence, if the alert is that a SMS message has come in, once the user has seen that alert screen, is he offered a direct route into reading the message and/or responding to the message.

BRIEF DESCRIPTION OF THE DRAWINGS

The invention will be further described with reference to the accompanying drawings in which:

FIG. 4 is a screen shot showing a top level screen;

FIG. 5 is a screen shot showing the top level screen displayed when a user navigates down one step through the top level screen functions shown in FIG. 4;

FIG. 6 is a screen shot showing the second level screen displayed when a user navigates one step deeper into the Phone Book function shown as selected in FIG. 4;

FIG. 7 is a screen shot showing the second level screen displayed when a user navigates down one step through the second level screen functions shown in FIG. 6 (i.e. down through the Phone Book functions);

FIG. 8 is a screen shot showing the second level screen displayed when a user navigates down one further step through the second level Phone Book functions shown in FIG. 7;

FIG. 9 is a screen shot showing the second level screen displayed when a user navigates up one step through the second level Phone Book functions shown in FIG. 8;

DETAILED DESCRIPTION

Figure 1:
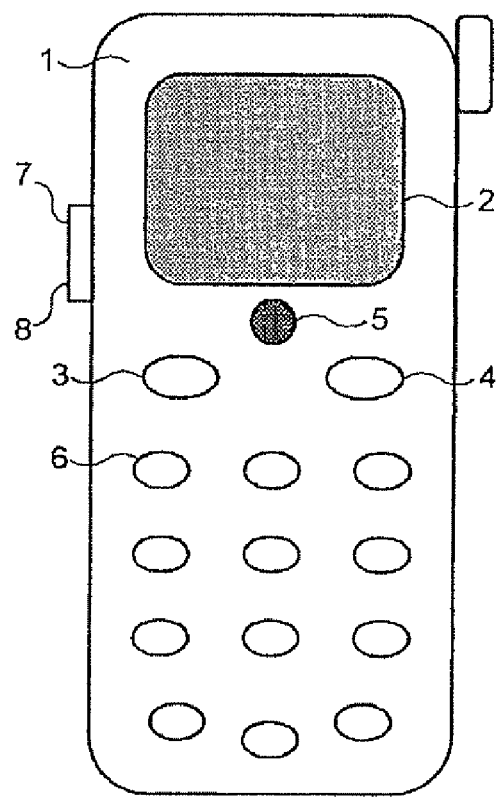
FIG. 1 is a plan view of a mobile telephone in accordance with the present invention.
Figure 2:
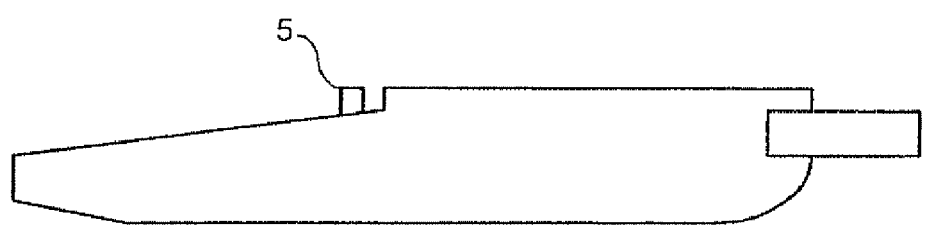
FIG. 2 is a side view of a mobile telephone in accordance with the present invention.
Figure 3:
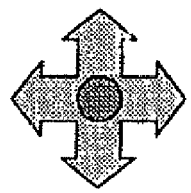
FIG. 3 is a plan view of the possible movement which a joystick may make.

Referring now to FIG. 1, a GSM mobile telephone is shown generally at 1. It includes the conventional features of a display 2, a start call button 4, an end call button 3 and numeric keys indicated generally at 6. Start call button 4 is commonly labelled with a green telephone handset shown off-hook or marked with the word 'SEND'. End call button 3 is commonly labelled with a red telephone handset shown on-hook or marked with the word 'END'. In addition, it also includes a joystick 5, which can be more clearly seen in FIG. 2 as comprising a short cylindrical member up standing from the front face of the telephone 1. As shown in FIG. 3, the joystick can be readily pushed by a user in one of 4 different directions. Joysticks of this kind are available from ITT Canon (ref. TPA 413G).

The MMI allows fast, intuitive navigation to take place. That is best appreciated from FIGS. 4 to 9. FIG. 4 is a screen shot showing a top level screen; the Phone Book icon is readily understood by a user to have been reached since it is (a) at the top of its line, (b) is coupled with the cartoon style call out including the explanatory text 'Phone Book' and (c)

no other icons include explanatory text. Hence the user is informed that the internal status of the telephone is such that Phone Book functions can be selected. (From a theoretical perspective, the mobile telephone can be though of as a state machine; effectively representing the actual state to a user and enabling the user to alter the condition of the state machine is the task of the MMI).

In FIG. 4, the next icon down the line is a telephone with an arrow. This represents the 'Diversion' function. To reach the Diversion function, the user nudges the joystick down. FIG. 5 shows the result: the Diversion function is shown at the top of the line, accompanied by a call out balloon stating 'Diversion'. Coupling the downwards nudge of the joystick with moving downwards through a line of icons makes navigation easily understood and readily achieved without any need for the user to takes his eyes off the display.

Returning to FIG. 1, the Phone Book function can be selected by simply nudging the joystick to the right; this takes the user to the Phone Book related features depicted in FIG. 6—a second level set of functions/features. The user is going deeper into the levels now, so that a nudge to the right is a natural way of expressing this movement. Each of the four top level icons appear to twist around through 180 degrees when the joystick is nudged to the right. Four icons appear to continue twisting around, but these are now icons of the second level functions related to the Phone Book function. These 4 new icons appear to rotate through 180 degrees to yield the FIG. 6 display.

FIG. 6 shows that the 'Consult' feature has been reached since the associated icon plus call out is at the top of the line. The 'Consult' feature can be selected simply by nudging the joystick to the right again. A phone book would then be displayed. If a different Phone Book feature is needed, then the user has to navigate down the list of second level Phone Book icons. One nudge down of the joystick takes the user to the display shown in FIG. 7; the feature 'Draft' has now moved to the top of the line and is accompanied by the call out 'Draft'. This icon, plus the other icons further down, appear to move up the line. The 'Draft' function can be readily selected with a nudge to the right. A further nudge down however takes the user down the line of Phone Book features to yield the FIG. 8 display, in which the 'Own number' feature has been reached. Moving up through the second level Phone book features is achieved through nudging the joystick up, as shown in FIG. 9. Returning to the top level screen (i.e. as depicted in FIG. 4) is achieved through nudging the joystick to the left.

Appendix 1 shows a more comprehensive list of the icons and/or words displayed on the display 2 for different levels. It therefore lists the features and functions which can be navigated to and from using the joystick. As explained above, a nudge to the right takes one down into a deeper level of the system (e.g. across a row from top to second level). The higher level icons twist around to reveal the icons of the lower level functions. Nudging left takes one up a level (e.g. across a row from third level to second level). The lower level icons twist around to reveal the icons of the higher level functions. Nudging down takes one down through the items at the same level (down a column) that are associated with the same immediately higher level function. The icons in the line appear to move upwards. Nudging up takes one up through the items at the same level (up a column) that are associated with the same immediately higher level function. The icons in the line appears to move downwards.

Figure 10:
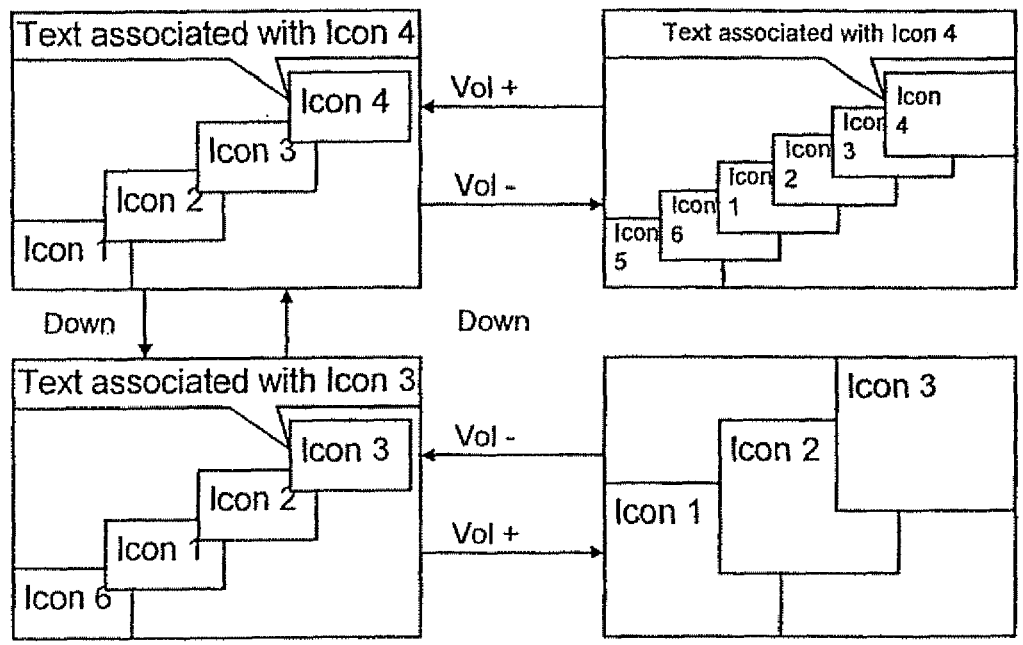
FIG. 10 is a schematic showing the effect of zooming on icon size.

A zoom function is also provided by which a user can cause the size of the icon and/or the word or words explaining the function of that icon displayed on the display to be altered. The zoom function is controlled by a volume up (FIG. 1, at 7) and a volume down button (FIG. 1, at 8). The user can zoom in and out as shown in FIG. 10; in addition the user can select that the word or words explaining the function of one or more icons is/are not displayed (FIG. 10, bottom right). This gives an uncluttered look to the display, which can be more appealing to a more experienced user. Also, it liberates screen space for more icons, which again can be appealing to more experienced users. Another earlier use of the volume controls to control a zoom function may be useful even where icons are not associated with any kind of explanatory text at all and such an embodiment is within the scope of a further aspect of the invention.

Figure 11:
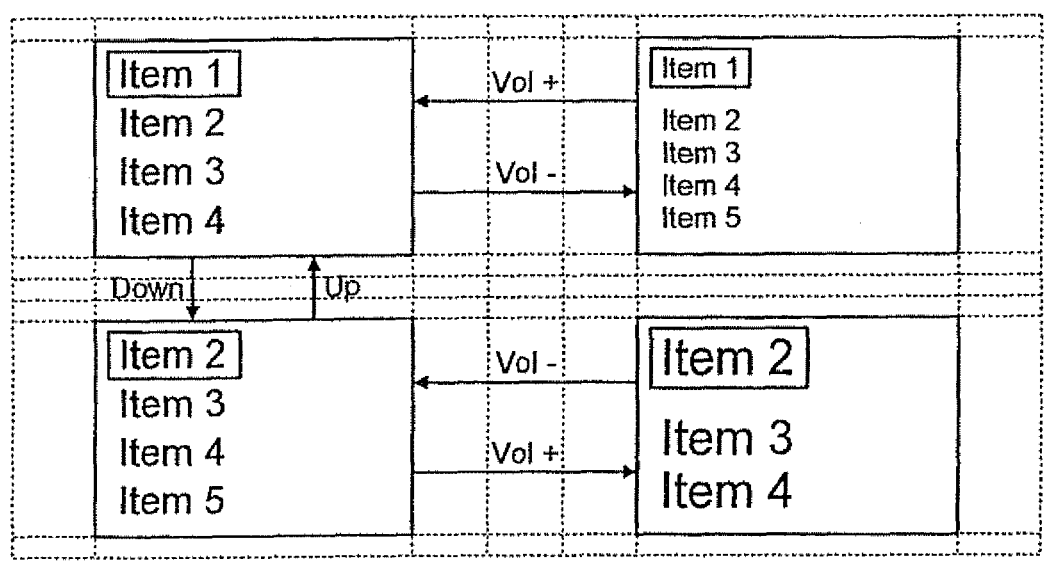
FIG. 11 is a schematic showing the effect of zooming on menu text size.
Figure 12:
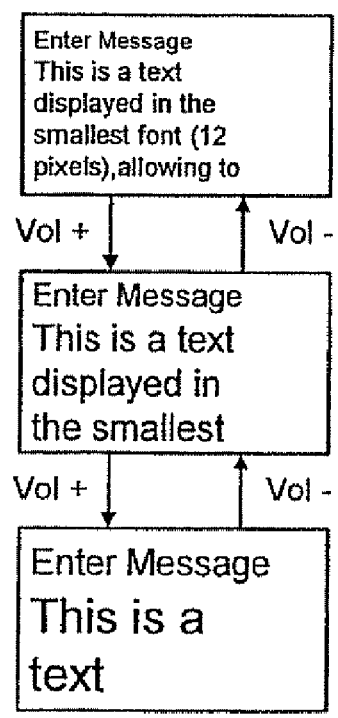
FIG. 12 is a schematic showing the effect of zooming on message text size.

FIG. 10 also shows how icons can be made to overlap, thereby allowing more icons to fit onto a display without destroying legibility. This purely text based implementation is illustrated at FIG. 11 for menu navigation. Zooming is also very useful when reading, text, such as in a SMS message. This is shown in FIG. 12.

Again, the use of the volume controls for zooming is intuitive, removes the need for additional zoom-specific keys and therefore saves cost and reduces the apparent complexity of the telephone. Arranging for the zoom In and zoom Out functions to be controlled by the volume keys is also attractive since it enables a user to perform a zoom at any stage in the navigation process (except during a call or in idle, where speaker and ringer are respectively managed by these keys). This is particularly helpful in enabling an inexperienced user to experiment with and therefore learn the structure of the navigation system.

The zoom function may alter in dependence on the selected mode or function of the mobile telephone to give one or more zoom settings optimised for the selected mode or function. For example, when editing text, the zoom can magnify an amount that is most relevant to seeing text clearly (and multiple zoom settings can be provided and accessed through multiple nudges of the zoom button). A different zoom amount may be appropriate for zooming into the normal icon based menus, and another for zooming into text only menus. The zoom function works particularly well with the mobile telephone of the first aspect of the present invention.

The data representing an icon is stored in memory; the same data can be used to display the icon at normal size (typically 16.times.16 pixels) and also at one or more different sizes, such as an extended size (64.times.64) using a software algorithm. This scalability removes the need to store multiple representations in memory, which is a valuable resource.

Figure 13:
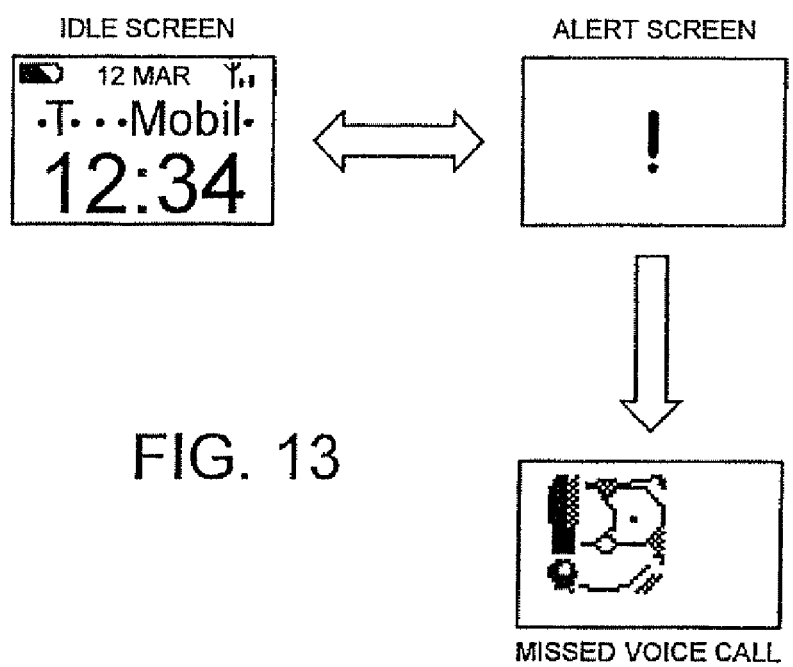
FIG. 13 is a screen shot showing how the idle screen alternates with the alert screen.

FIG. 13 shows the idle screen: the idle screen alternates with an alert screen, such as a Missed SMS screen, or a Voice Mail screen or a Missed Call Alert. This leads to the layout of the idle screen not being cluttered with any kind of alert messages: conventionally, an alert message will be included together with the idle screen (e.g. 1 missed call'; 'You have a SMS'), but that clutters the screen and can obscure important branding information. In the present embodiment, the idle screen is shown for 5 seconds, and then an alert screen for 5 seconds if there are any alerts, as illustrated in FIG. 13. The screens alternate until the user reads or reviews the alert screen by pressing OK on the joystick. The phone will then display a static alert screen with one icon for every pending event (missed call, received SMS, . . . ). In FIG. 13, the alert screen shows the Missed Call icon. This can be accompanied with the words 'Missed Call'.

Accessing the alert screen can take the user directly to the menu(s) which allow the user to respond to the alert. Hence, if the alert is that a SMS message has come in, once the user has seen that alert screen, is he offered a direct route into reading the message and/or responding to the message.

APPENDIX 1

| Top level functions | Second level functions (all icons are task specific) | Third level functions (Words only, unless otherwise stated) | Fourth level functions (Words only, unless otherwise stated) |
|---|---|---|---|
| Phone Book Icon + words 'Phone Book" | Icon + word 'Consult' | Open up address book | |
| | Icon + word 'Draft' | Enter Name | |
| | Icon + word 'Own Number' | Display Own Number | |
| | Icon + word 'Capacity' | Display storage info | |
| | Icon + word 'Restrict' | Enter restriction PIN | |
| | Icon + word 'Business Card' | Enter your business card details | |
| Message Icon + word "Messages' | Icon + word 'Write Message' | Create New | Write Message |
| | | User pre-defined | Select a pre-defined message |
| | Icon + words 'In Box' | List in-coming messages | |
| | Icon + words 'Out Box' | List outgoing messages | |
| | Icon + words Capacity | Displays storage info | |
| | Icon + word 'Settings' | Service Center | Message Center Number |
| | | Validity Period | Select validity period option |
| | | Message type | Select message type (e.g., fax, email, x400, standard text, telex |
| | | Delivery Report | Select 'on' or 'off' options |
| | | Reply via same | Select 'on' or 'off' options |
| | | Melody | Select Melody option |
| | Icon + words 'Cell Broadcast' | Receive CB | Select cell broadcast 'on' or 'off' |
| Call Register Icon + words "Call Register' | Icon + words 'Missed Calls' | Lists missed calls | |
| | Icon + words 'Received calls' | Lists received calls | |
| | Icon + words 'Dialled calls' | Lists dialed calls | Send message to; Call number; Forward calls to; Save number; Options to select; then takes you to appropriate screen |
| | Icon + words 'Delete' | Lists Missed calls, Received calls, Dialled Calls, All calls | |
| Counters Icon + word 'Counters' | Icon + word 'Time' | Last call; all calls out; all calls in; Clear timers | Display time count data |
| Divert Icon + word 'Divert' | Unconditional; all unanswered; if busy, if no reply; if not reachable | Activate; de-activate and status check | Voice, fax, data all options to select, then takes you to phone book to select number to receive diversions |
| Settings icon + word 'Settings' | Icon + word 'Language' | List of various language options to select | |
| | Icon + words 'Alert tones' | Icon + words 'Melodies' | All cases; number stored; Number not stored; messages; Alarm to be selected; then gives lists of melodies to select |
| | | Icon + words 'Key Tones' | On, Off and DTMF tones to be selected |
| | | Icon + words 'Deep Silent' | On or off to be selected |
| | | Icon + words 'Ringer Volume' | 3 ranges to be selected |
| | Icon + words 'Auto key lock' | On or off to be selected | |
| | Icon + word 'Security' | Change PIN and Disable PIN options | Enter PIN required |
| | Icon + word 'Time & Date' | Displays time and Date | Alter time and date |

APPENDIX 1-continued

| Top level functions | Second level functions (all icons are task specific) | Third level functions (Words only, unless otherwise stated) | Fourth level functions (Words only, unless otherwise stated) |
|---|---|---|---|
| | Icon + word 'Auto-answer' | On of off to be selected | |
| | Icon + word 'Hot keys' | Lists hot keys | |
| | Icon + word 'Contrast' | Select 1-3 contrast scale | |
| Network Icon + word 'Network' | Icon + word 'Services' | barring | Select outgoing, incoming, barring password |
| | | Call waiting | Activate, de-activate, status check |
| | | Identification | See call ID; call incognito; see connected ID; connect incognito; status check |
| | Auto-redial | On or off to be selected | |
| | Change network | | |
| | Preferred networks | Lists preferred networks | |
| | Registration mode | Lists automatic, manual, force network | |
| Demonstration Icon + word "Demonstration' | Give a demo of the phone | | |
| Tools Icon + word 'Tools' | | | |
| IrDA Icon + words 'IrDA Activation' | | | |

What is claimed is:

1. A mobile telephone comprising:
a memory, the memory storing data representing a plurality of icons, wherein each icon corresponds to an operation or set of operations that can be performed on the mobile telephone;
a display that displays one or more of the plurality of icons;
a graphical user interface controlling the display based upon signals received from a navigational tool on the mobile telephone; and
a volume control on the mobile telephone,
wherein the navigational tool is operable to select one of the plurality of icons displayed on the display, and wherein when the navigational tool has been used to select one of the plurality of icons shown on the display, the volume control is operable to increase or decrease the size of the selected icon.

2. The mobile telephone of claim 1, wherein the navigational tool is one of a joystick and a rocker switch.

3. The mobile telephone of claim 1, wherein the memory stores data representing textual images associated with the plurality of icons, wherein the display displays the textual images, and wherein the volume control is operable to increase or decrease the size of textual images shown on the display.

4. The mobile telephone of claim 1, wherein the selected icon is animated upon selection.

5. The mobile telephone of claim 1, wherein the memory stores data representing textual images associated with the plurality of icons, wherein the display displays the textual images, wherein the navigational tool can be used to select a textual image displayed on the display, and wherein when the navigational tool has been used to select a textual image shown on the display, the volume control is operable to increase or decrease the size of the selected textual image.

6. The mobile telephone of claim 1, wherein the memory stores data representing textual images associated with the plurality of icons, wherein the display displays the textual images, and wherein the display shows a plurality of overlapping textual images.

7. The mobile telephone of claim 1, wherein the size of the selected icon increases or decreases at increments that are dependent upon the selected icon.

8. The mobile telephone of claim 1, wherein the memory stores data representing textual images associated with the plurality of icons, wherein the display displays the textual images, and wherein the textual images comprise explanatory text.

9. A method for operating a mobile telephone comprising:
displaying a plurality of selectable icons on a display of the mobile telephone;
receiving a selection of one of the plurality of icons through a navigational tool on the mobile telephone; and
changing the size of the selected icon in response to input received through a volume control on the mobile telephone,
wherein each icon represents an operation or set of operations that can be performed on the mobile telephone.

10. The method of claim 9, wherein data corresponding to each icon are stored in a memory, and wherein each icon has an explanatory textual image associated with the each icon.

11. The method of claim 10, wherein the display shows the explanatory textual image associated with the selected icon.

12. The method of claim 11, wherein the display does not show textual images associated with non-selected icons.

13. The method of claim 11, further comprising changing the size of the explanatory textual image in response to input received through the volume control.

14. The method of claim 9, wherein the navigational tool is one of a joystick and a rocker switch.

15. A method for operating a mobile telephone comprising:
storing data representing textual images in a memory of the mobile telephone;

displaying one or more of the textual images on a display of the mobile telephone;

receiving a selection of a textual image of the one or more textual images through a navigational tool on the mobile telephone; and changing the size of the selected textual image in response to input received through a volume control on the mobile telephone, wherein each textual image represents an operation or set of operations that can be performed on the mobile telephone.

16. The method of claim 15, further comprising storing data representing icons in a memory and displaying icons representing operations or sets of operations on the display.

17. The method of claim 16, further comprising receiving a selection of an icon of the displayed icons through the navigational tool, wherein a textual image associated with the selected icon is displayed on the display and textual images associated with the remaining displayed icons are not displayed on the display.

18. The method of claim 17, further comprising animating the selected icon upon selection.

19. The method of claim 15, further comprising optimizing the function of changing the size of the textual image according to the operation or set of operations represented by the textual image.

20. The method of claim 15, wherein the navigational tool is one of a joystick and a rocker switch.

* * * * *